United States Patent Office 3,709,906
Patented Jan. 9, 1973

---

3,709,906
2-ALKYL-4,5-DIPHENYLPYRROLE DERIVATIVES
Norio Yoshida, Kuniyuki Tomita, and Yoshio Iizuka, Tokyo, Japan, assignors to Sankyo Company Limited, Tokyo, Japan
No Drawing. Filed July 18, 1969, Ser. No. 17,359
Claims priority, application Japan, July 26, 1968, 43/52,832; Apr. 19, 1969, 44/30,491; June 16, 1969, 44/47,486
Int. Cl. C07d 27/22
U.S. Cl. 260—326.5 M   9 Claims

ABSTRACT OF THE DISCLOSURE

Novel 2-alkyl-4,5-diphenylpyrrole derivatives of the formula

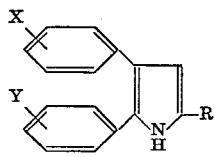

wherein X and Y may be the same or different and each represents hydrogen atom, a lower alkyl group, a lower alkoxy group, an N-di(lower alkyl) amino group of a halogen atom, provided that both X and Y are not hydrogen atom, and R represents a lower alkyl group.

The products have pharmacological properties and are useful as anti-inflammatory agents and prepared by reacting a benzoin derivative having the formula

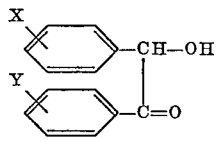

wherein X and Y are as defined above with ammonia and a keto-compound having the formula

wherein R is as defined above and Z represents an esterified carboxyl group, cyano group or a carbamoyl group which may be substituted with alkyl or phenyl to produce a 3-substituted pyrrole derivative having the formula

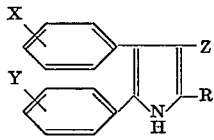

wherein X, Y, R and Z are as defined above and heating the product with an acid or an alkali substance.

---

This invention relates to novel 2-alkyl-4,5-diphenylpyrrole derivatives.

More particularly, this invention relates to novel pyrrole derivatives having the formula

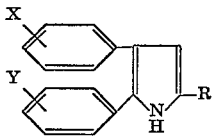

wherein

X and Y may be the same or different and each represents hydrogen atom, a lower alkyl group, a lower alkoxy group, an N-di(lower alkyl) amino group or a halogen atom, provided that both X and Y are not hydrogen atom, and R represents a lower alkyl group.

In the above Formula I, the lower alkyl group can be a straight or branched alkyl group such as methyl, ethyl, n-propyl, isopropyl, n-butyl, isobutyl, and the like. Examples of the lower alkoxy group are methoxy, ethoxy, n-propoxy, isopropoxy, n-butoxy, isobutoxy and the like. Examples of the N-di(lower alkyl) amino group are N-dimethylamino, N-diethylamino, N-dipropylamino, N-dibutylamino and the like.

The halogen atom can be fluorine, chlorine, bromine or iodine. In the above Formula I, X and Y can be substituted in ortho-, meta- or para-position of the phenyl moieties, but preferably they are substituted in para-position of the phenyl moieties. In the present invention, especially preferable compounds are a pyrrole derivative having the formula

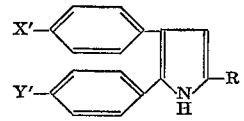

wherein R is as defined above and X' and Y' may be the same or different and each represents a lower alkoxy group or a halogen atom, provided that at least one of X' and Y' is a lower alkoxy group.

All of the pyrrole derivatives of the above Formula I are novel compounds unknown in the prior art. We have unexpectedly found that they have high anti-inflammatory activities and extremely low toxicities to humans and less tendency to produce side effects.

Heretofore, 2,3-diphenyl-5-methylpyrrole and 2,3-bis(p-methoxyphenyl) pyrrole are disclosed in the Australian Journal of Chemistry, vol. 19, p. 1871 (1966) and the Journal of Medicinal Chemistry, vol. 9, p. 527 (1966).

However, anti-inflammatory activities of said prior compounds have not been suggested or disclosed and, according to disclosure of the Journal of Medicinal Chemistry, it is known that 2,3-bis(p-methoxyphenyl) pyrrole does not exhibit an anti-inflammatory activity.

Thereafore a pyrrole derivative having an anti-inflammatory activity has been unknown in the prior art.

Accordingly it is the object of this invention to provide novel compounds represented by the above Formula I having an anti-inflammatory activity.

This invention also provides pharmaceutical compositions comprising a compound (I) of this invention together with an inert non-toxic carrier, diluent or coating.

These compositions may be generally administered orally in unit dosage forms, e.g. tablets or capsules. Although the optimum quantities of these compounds of this invention to be used in such manner will depend on the particular compound employed and the particular type of disease, the total daily dosage for adults is of about 50–500 mg., preferably in multiple doses such as three or more times a day.

Representative pyrrole derivatives provided by this invention include the following:

2-methyl-4,5-bis(p-methoxyphenyl) pyrrole,
  M.P. 127.5–128.5° C.
2-ethyl-4,5-bis(p-methoxyphenyl) pyrrole,
  M.P. 152–153.5° C.
2-methyl-4-(p-chlorophenyl)-5-(p-methoxyphenyl) pyrrole, M.P. 112.5–113.5° C.
2-methyl-4-(p-methoxyphenyl)-5-(p-chlorophenyl) pyrrole, M.P. 78–82° C.
2-n-butyl-4,5-bis(p-methoxyphenyl) pyrrole,
  M.P. 85.5–87.5° C.

2-isobutyl-4,5-bis(p-methoxyphenyl) pyrrole, M.P. 119–120.5° C.
2-n-propyl-4,5-bis(p-methoxyphenyl) pyrrole, M.P. 101.5–102° C.
2-methyl-4,5-bis(p-methylphenyl) pyrrole, M.P. 104.5–105° C.
2-methyl-4-(p-dimethylaminophenyl)-5-(p-methoxyphenyl) pyrrole, M.P. 190.5–191.5° C.
2-methyl-4,5-bis(p-dimethylaminophenyl) pyrrole, M.P. 110.5–112° C.
2-methyl-4,5-bis(p-chlorophenyl) pyrrole, M.P. 132.5–133.5° C.
2-methyl-4-phenyl-5-(p-chlorophenyl) pyrrole, B.P. 173–176° C./0.05 mm. Hg
2-methyl-4-phenyl-5-(p-dimethylaminophenyl) pyrrole, M.P. 138.5–140.5° C.
2-methyl-4-(p-methoxyphenyl)-5-phenyl pyrrole, B.P. 220–225° C./0.05 mm. Hg
2-methyl-4-phenyl-5-(p-methoxyphenyl) pyrrole, M.P. 131–132° C.

The following experimental data will evidently show that the pyrrole derivatives of the present invention exhibit very potent anti-inflammatory activities and have extremely low toxicities.

ANTI-INFLAMMATORY ACTIVITY IN RAT

(1) Method

Anti-inflammatory activity is measured by the oral administration of drug in terms of inhibition of rat's paw edema produced by the injection of 1% carrageenin suspension. A volume of 0.05 ml. of carrageenin suspension in saline is injected subcutaneously into the plantar region of the hind paw 30 minutes after the administration of drug.

The volume of the foot is measured before and 3 hours after the injection of carrageenin. The degree of inhibition is calculated according to the following equation:

Percent inhibition $$= \frac{\left(\frac{V\ 3\ hrs.\ U}{V\ before.\ U} - 1\right) - \left(\frac{V\ 3\ hrs.\ T}{V\ before.\ T} - 1\right)}{\left(\frac{V\ 3\ hrs.\ U}{V\ before.\ U} - 1\right)}$$

V before.U: the volume of foot of untreated group before the injection of carrageenin.
V 3 hrs.U: the volume of foot of untreated group 3 hours after injection of carrageenin.
V before.T: the volume of foot of treated group before the injection of carrageenin.
V 3 hrs.T: the volume of foot of treated group 3 hours after the injection of carrageenin.

(2) Results

The results are given in Table I and II. In Table I, data are expressed as the percent inhibition at a fixed dose, 100 mg. per kg. of body weight. In Table II, in which are listed the most active compounds, the anti-inflammatory effect of them are expressed in terms of $ED_{50}$, namely the dose required for 50% inhibition of edema.

ACUTE TOXICITY

(1) Method

Acute toxicity is determined by the oral administration of drug in terms of the lethal effect on mouse for one week.

The lethal effect is expressed as $x/n$, in which $x$ is the number of animals died, and $n$ is the total number of animals used.

(2) Result

Results are given in Table I.

TABLE I.—ANTI-INFLAMMATORY EFFECT AND ACUTE TOXICITY OF DRUGS AFTER ORAL ADMINISTRATION

| Compound | Inhibition of carrageenin edema (percent inhibition, 100 mg./kg.) | Acute toxicity Dose (mg./kg.) | x/n |
|---|---|---|---|
| 2-methyl-4,5-bis(p-methoxyphenyl) pyrrole | 72 | [1] 900 | 0/5 |
| 2-ethyl-4,5-bis(p-methoxyphenyl) pyrrole | 62 | 900 | 0/5 |
| 2-methyl-4-(p-chlorophenyl)-5-(p-methoxyphenyl) pyrrole | 58 | 900 | 0/5 |
| 2-methyl-4-(p-methoxyphenyl)-5-(p-chlorophenyl) pyrrole | 57 | 900 | 0/5 |
| 2-n-butyl-4,5-bis(p-methoxyphenyl) pyrrole | 55 | 900 | 0/5 |
| 2-isobutyl-4,5-bis(p-methoxyphenyl) pyrrole | 55 | 900 | 0/5 |
| 2-n-propyl-4,5-bis(p-methoxyphenyl) pyrrole | 52 | 900 | 0/5 |
| 2-methyl-4,5-bis(p-methylphenyl) pyrrole | 47 | 900 | 0/5 |
| 2-methyl-4-(p-dimethylaminophenyl)-5-(p-methoxyphenyl) pyrrole | 39 | 900 | 0/5 |
| 2-methyl-4,5-bis(p-dimethylaminophenyl) pyrrole | 36 | 900 | 0/5 |
| 2-methyl-4,5-bis(p-chlorophenyl) pyrrole | 34 | 900 | 0/5 |
| 2-methyl-4-phenyl-5-(p-dimethylaminophenyl) pyrrole | 32 | 900 | 0/5 |
| 2-methyl-4-phenyl-5-(p-chlorophenyl) pyrrole | 32 | 900 | 0/5 |
| Phenylbutazone | 55 | [2] | |

[1] $LD_{50}$: 3,500.
[2] $LD_{50}$: 490.

Table II.—Anti-inflammatory effect of drugs expressed in terms of $ED_{50}$

Compound: $ED_{50}$ [1]
- 2-methyl-4,5-bis(p-methoxyphenyl) pyrrole — 7
- 2-ethyl-4,5-bis(p-methoxyphenyl) pyrrole — 24
- 2-methyl-4-(p-chlorophenyl)-5-(p-methoxyphenyl) pyrrole — 52
- 2-methyl-4-(p-methoxyphenyl)-5-(p-chlorophenyl) pyrrole — 74
- 2-n-butyl-4,5-bis(p-methoxyphenyl) pyrrole — 80
- 2-isobutyl-4,5-bis(p-methoxyphenyl) pyrrole — 84
- Phenylbutazone — 76

[1] Dose mg./kg. required for 50% inhibition of carrageenin edema.

The pyrrole derivatives of the above Formula I can be prepared by a process which comprises reacting a benzoin derivative having the formula

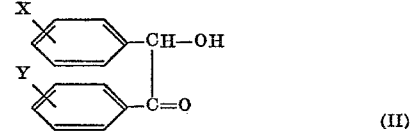

(II)

wherein X and Y are as defined above with ammonia and a keto-compound having the formula

(III)

wherein R is as defined above and Z represents an esterified carboxyl group such as methoxycarbonyl, ethoxycarbonyl, phenoxycarbonyl and benzyloxycarbonyl; cyano group; a carbamoyl group which may be substituted with alkyl or phenyl to produce a 3-substituted pyrrole derivative having the formula

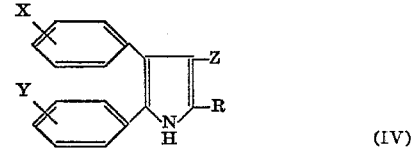

(IV)

wherein X, Y, R and Z are as defined above and then heating the product (IV) with an acid or an alkali substance.

In carrying out the step for the preparation of the compound (IV) from the compounds (II) and (III) in the process, the reaction may be preferably carried out in the presence of an inert organic solvent. As the solvent, there may be satisfactorily employed any organic solvents which would not adversely affect the reaction in the step.

Representative examples of these inert organic solvents include a hydrocarbon such as benzene, toluene and xylene; a lower alkanol such as methanol and ethanol; a cyclic ether such as dioxane and tetrahydrofuran; a lower aliphatic carboxylic acid such as acetic acid and propionic acid. Most preferably a lower aliphatic carboxylic acid such as acetic acid is employed.

The ammonia employed in the step may be ammonia as such or an ammonium salt of a weak acid which is capable of providing ammonia in the reaction system. Examples of these ammonium salts are ammonium carbonate, ammonium acetate, ammonium formate, ammonium oxalate and ammonium cyanate. Usually ammonium acetate is employed because of being easily available and stable.

The reaction temperature in the step is not critical, but it is found that heating may favourably accelerate the reaction in the step. It is preferable to conduct the reaction at a reflux temperature of the reaction solvent employed when a reaction solvent is not employed, it is preferable to conduct the reaction at a temperature of from about 100° C. to 150° C.

The reaction period also is not critical and may be varied, for example, from one hour to 5 hours depending upon the kind of the starting material and reaction solvent employed, the reaction temperature applied and other factors.

After completion of the reaction, the desired product (IV) may be easily recovered from the reaction mixture by a conventional means. For instance, the reaction product may be recovered by pouring the reaction mixture into ice water and separating precipitates formed in the mixture by filtration. When the desired product does not precipitate or incompletely precipitates, the reaction product may be recovered by extraction of the desired product with a suitable extraction solvent such as benzene, washing and drying the extracts and subsequent removal of the extraction solvent. If desired, the crude product thus obtained may be purifed by a conventional means, e.g. recrystallization or chromatography technique.

In carrying out the step for the preparation of the compound (I) from the compound (IV) in the process, the reaction may be carried out by heating the compound (IV) with an acid or an alkali substance in the presence of an inert solvent thereby to cause hydrolysis and decarboxylation reaction.

As the solvent, there may be satisfactorily employed water and an aqueous organic solvent such as aqueous ethanol and aqueous dioxane. Examples of the acid employed in the step include mineral acids such as sulfuric acid, hydrochloric acid and a strong organic acid such as benzene sulfonic acid and p-toluene sulfonic acid.

Examples of the alkali substance employed in the step include alkali metal hydroxides such as sodium hydroxide and potassium hydroxide and alkali earth metal hydroxides such as calcium hydroxide and barium hydroxide.

Most preferably, about 80% aqueous sulfuric acid is employed.

The reaction temperature in the step is not critical, but it is preferable to conduct the reaction at a temperature of about 80–140° C. when the acid is employed and about 100–250° C. when the alkali substance is employed.

The reaction period also is not critical and it may be varied depending upon the kind of the reactants and the reaction temperature applied. When the acid is employed, the reaction period is from about 15 minutes to 5 hours. When the alkali substance is employed, the reaction period is from about 10 hours to 48 hours.

After completion of the reaction, the desired product (I) may be recovered from the reaction mixture by a conventional means. For instance, the reaction product may be recovered by pouring the reaction mixture into ice water and separating precipitates formed in the mixture by filtration. When the desired product does not precipitate or incompletely precipitates, the reaction product may be recovered by extraction of the desired product with a suitable extraction solvent such as benzene, washing and drying the extracts and subsequent removal of the extraction solvent. If desired, the crude product thus obtained may be purified by a conventional means, e.g. recrystallization or chromatography technique.

The following examples are given for the purpose of illustrating the process for the preparation of the compounds (IV) and (V).

EXAMPLE 1

2-methyl-3-ethoxycarbonyl-4,5-bis(p-methoxyphenyl) pyrrole

To a solution of 12.9 g. of anisoin in 100 ml. of acetic acid were added 9.5 g. of ethyl acetoacetate and 15 g. of ammonium acetate. The resulting mixture was heated under reflux for 2 hours. After completion of the reaction, the reaction mixture was poured into 1.5 l. of ice water and left for one hour. Precipitates which formed in the mixture were separated by filtration, washed successively with water, an aqueous solution of sodium bicarbonate and water, dried in a desiccator to give 16.4 g. of the desired product as crude crystalline substances. The crystalline substances were purified with active carbon in 95% aqueous ethanol and recrystallized from aqueous ethanol to give the pure product as white needles melting at 136.5–138° C.

*Analysis.*—Calculated for $C_{22}H_{23}O_4N$ (percent): C, 72.31; H, 6.34; N, 3.83. Found (percent): C, 72.18; H, 6.30; N, 3.89.

By the same procedure as in Example 1, the following pyrrole compounds were produced from the corresponding benzoin derivatives in good yield by heating with ammonium acetate and a keto-compound in the presence of acetic acid.

2-methyl-3-benzyloxycarbonyl-4,5-bis(p-methoxyphenyl) pyrrole, M.P. 118° C.

2-ethyl-3-ethoxycarbonyl-4,5-bis(p-methoxyphenyl) pyrrole, M.P. 137–140° C.

2-n-propyl-3-ethoxycarbonyl-4,5-bis(p-methoxyphenyl) pyrrole, M.P. 103–104.5° C.

2-n-butyl-3-ethoxycarbonyl-4,5-bis(p-methoxyphenyl) pyrrole, M.P. 94–95.5° C.

2-methyl-3-ethoxycarbonyl-4-phenyl-5-(p-methoxyphenyl) pyrrole, M.P. 168–170° C.

2-methyl-3-ethoxycarbonyl-4-(p-methoxyphenyl)-5-phenyl pyrrole, M.P. 148–149.5° C.

2-methyl-3-ethoxycarbonyl-4,5-bis(p-methylphenyl) pyrrole, M.P. 162.5–163.5° C.

2-methyl-3-ethoxycarbonyl-4,5-bis(p-chlorophenyl) pyrrole, M.P. 198–201° C.

2-methyl-3-ethoxycarbonyl-4-(p-methoxyphenyl)-5-(p-chlorophenyl) pyrrole, M.P. 206–208° C.

2-methyl-3-ethoxycarbonyl-4-phenyl-5-(p-dimethylaminophenyl) pyrrole, M.P. 172.5–174.5° C.

2-methyl-3-ethoxycarbonyl-4,5-bis(p-dimethylamino phenyl) pyrrole, M.P. 226.5–228.5° C.

2-methyl-3-ethoxycarbonyl-4-(p-chlorophenyl)-5-(p-dimethylaminophenyl) pyrrole, M.P. 195–197° C.

2-methyl-3-phenylcarbamoyl-4,5-bis(p-methoxyphenyl) pyrrole, M.P. 198–199° C.

2-methyl-3-carbamoyl-4,5-bis(p-methoxyphenyl) pyrrole, M.P. 219.5–220.5° C.

2 - methyl-3-cyano-4,5-bis (p-methoxyphenyl) pyrrole, M.P. 180–181° C.

2-methyl-3-cyano-4,5-bis(p-chlorophenyl) pyrrole M.P 267–269° C.

EXAMPLE 2

2-methyl-4,5-bis(p-methoxyphenyl) pyrrole (1) To 150 ml. of 80% aqueous sulfuric acid were added 10 g. of 2-methyl-3-ethoxycarbonyl-4,5-bis(p-methoxyphenyl) pyrrole. The resulting mixture was stirred at 80° C. for 10 minutes. After completion of the reaction, the reaction mixture was poured into 300 g. of ice water. Precipitates formed in the mixture were separated by filtration, washed with water and dried to give 6.7 g. of the desired product as crude crystalline substances. The crystalline substances were recrystallized from a mixture of benzene and petroleum benzine to give colorless prisms melting at 127.5–128.5° C.

*Analysis.*—Calculated for $C_{19}H_{19}O_2$ (percent): C, 77.79; H, 6.53; N, 4.77. Found (percent): C, 77.89; H, 6.48; N, 4.78.

(2) To 6 ml. of 80% aqueous sulfuric acid were added 0.5 g. of 2-methyl-3-phenylcarbamoyl-4,5-bis(p-methoxyphenyl) pyrrole. The resulting mixture was heated at 80–90° C. for 15 minutes. After completion of the reaction, the reaction mixture was poured into 15 g. of ice water. Precipitates formed in the mixture were filtered and washed with water. The resulting crystalline substance were dissolved in benzene, insoluble materials were removed by filtration and the solvent was distilled off. There was left 0.2 g. of the desired product which was then recrystallized from a mixture of benzene and petroleum benzine to give colorless prisms melting at 127.5–128.5° C.

EXAMPLE 3

2-methyl-4,5-bis(p-chlorophenyl) pyrrole

To 5 ml. of 80% aqueous sulfuric acid were added 0.3 g. of 2-methyl-3-cyano-4,5-bis(p-chlorophenyl) pyrrole. The resulting mixture was heated at 130° C. for 2 hours. After completion of the reaction, the reaction mixture was poured into 10 g. of ice water. The mixture was extracted with benzene. The benzene extract was washed successively with water, a saturated aqueous solution of sodium bicarbonate and water, dried over anhydrous sodium sulfate and the solvent was distilled off. 0.1 g. of the desired product as crystalline substances were obtained and recrystallized from a mixture of ether and petroleum benzine to give pale brown prisms melting at 132.5–133.5° C.

*Analysis.*—Calculated for $C_{17}H_{13}NCl_2$ (percent): C, 67.57; H, 4.33; N, 4.61; Cl, 23.46. Found (percent): C, 67.33; H, 4.58; N, 4.36; Cl, 23.27.

What is claimed is:

1. A compound having the formula

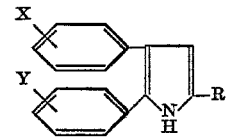

wherein X and Y may be the same or different and each represents hydrogen atom, a lower alkyl group, a lower alkoxy group, an N-di(lower alkyl) amino group or a halogen atom, provided that both X and Y are not hydrogen atom, and R represents a lower alkyl group.

2. A compound having the formula

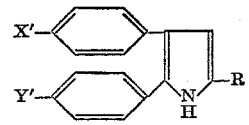

wherein X' and Y' may be the same or different and each represents a lower alkoxy group or a halogen atom, at least one of X' and Y' being a lower alkoxy group, and R represents a lower alkyl group.

3. 2-methyl-4,5-bis(p-methoxyphenyl) pyrrole.
4. 2-ethyl-4,5-bis(p-methoxyphenyl) pyrrole.
5. 2 - methyl - 4 - p - chlorophenyl-5-methoxyphenyl-pyrrole.
6. 2 - methyl - 4 - p - methoxyphenyl - 5 - p-chlorophenylpyrrole.
7. 2 - n - butyl - 4,5 - bis(p-methoxyphenyl) pyrrole.
8. 2 - isobutyl - 4,5 - bis(p-methoxyphenyl) pyrrole.
9. 2 - n - propyl - 4,5 - bis(p-methoxyphenyl) pyrrole.

References Cited

UNITED STATES PATENTS 3,462,451   8/1969   Szmuszkovicz _____ 260—326.5

OTHER REFERENCES

Guy et al.: Aust. J. Chem., 19, 1871–81 (1966).

ALEX MAZEL, Primary Examiner

J. A. NARCAVAGE, Assistant Examiner

U.S. Cl. X.R.

260—313.1, 326.3, 326.62, 326.5 L, 326.9; 424—274